United States Patent
Kim et al.

(10) Patent No.: US 8,736,789 B2
(45) Date of Patent: May 27, 2014

(54) SLIM LCD MODULE AND A SOCKET THEREFOR

(75) Inventors: Yong-Hwi Kim, Asan-si (KR); Hyun-Chul Bae, Cheonan-si (KR); Seong-Sik Choi, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 289 days.

(21) Appl. No.: 12/947,199

(22) Filed: Nov. 16, 2010

(65) Prior Publication Data

US 2011/0122333 A1    May 26, 2011

(30) Foreign Application Priority Data

Nov. 26, 2009   (KR) ................ 10-2009-0115301

(51) Int. Cl.
   *G02F 1/1335*   (2006.01)
(52) U.S. Cl.
   USPC .......................................... 349/69

(58) Field of Classification Search
   USPC ............................................. 349/69
   See application file for complete search history.

(56) References Cited

U.S. PATENT DOCUMENTS

| 2008/0180593 | A1* | 7/2008 | Cho et al. ............ 349/58 |
| 2009/0128734 | A1* | 5/2009 | Cho et al. ............ 349/61 |
| 2009/0191741 | A1* | 7/2009 | Cho et al. ............ 439/232 |
| 2009/0310058 | A1* | 12/2009 | Kim et al. ............ 349/58 |

FOREIGN PATENT DOCUMENTS

| JP | 2007-335178 | 12/2007 |
| KR | 1020080055134 | 6/2008 |
| KR | 1020080071359 | 8/2008 |

* cited by examiner

*Primary Examiner* — Phu Vu
(74) *Attorney, Agent, or Firm* — F. Chau & Associates, LLC

(57) ABSTRACT

An LCD module including an LCD panel and a backlight unit disposed under the LCD panel is provided. The backlight unit has a bottom chassis, a lamp, a socket, and a balance board. The bottom chassis receives the lamp, the socket, and the balance board therein. The balance board is fixed to the bottom chassis. The socket is coupled with the balance board and the lamp.

18 Claims, 8 Drawing Sheets

SLIM LCD MODULE AND A SOCKET THEREFOR

CROSS-REFERENCE TO RELATED APPLICATION

This application claims priority to Korean Patent Application No. 2009-0115301 filed on Nov. 26, 2009, the contents of which are herein incorporated by reference in their entirety.

BACKGROUND

1. Technical Field

The present invention relates to an LCD module using a lamp, and more particularly, to a slim LCD module having a socket which mechanically fixes the lamp and electrically connects the lamp to a power source.

2. Discussion of the Related Art

A liquid crystal display (LCD) is used in various industries because of being lightweight and low power consumption. However, since a liquid crystal panel included in an LCD cannot generate light by itself, a backlight unit having an independent light source for providing light to the liquid crystal panel has been used.

A cold cathode fluorescent lamp (CCFL) has been used as the light source for the backlight unit. Electrodes of the CCFL are electrically connected via lead wires to a power source which generates a voltage required to drive the CCFL. Further, the CCFL is mechanically fixed at a predetermined position in a backlight unit. To achieve both the electrical connection and the mechanical fixation, a socket is used.

FIGS. 1 and 2 show a conventional LCD module. In the LCD module, a bottom chassis 200 receives a lamp 210, such as a CCFL, as a light source. A lamp 210 is connected via a socket 220 to an inverter PCB (Printed Circuit Board) 240. An inverter is formed on the inverter PCB 240 and the inverter PCB 240 is disposed on the outer bottom surface of the bottom chassis. The socket 220 connects the inside and outside of the bottom chassis 200 with each other through an opening 205 formed on the bottom chassis 200. An inverter cover 250 is attached onto the lower surface of the bottom chassis 200 to protect the inverter PCB 240. Part of the socket positioned inside of the bottom chassis is covered by a side mold 260. The LCD module includes a backlight unit. The backlight unit includes the bottom chassis 200, the lamp 210, the socket 220, and the inverter.

The LCD module may include various optical sheets 130, a mold frame 120, and an LCD panel 100 over the side mold 260, and a top chassis 110.

As can be seen from FIG. 2, a socket used in a conventional LCD module includes a conductive part 221 and a housing 222. The conductive part 221 is formed of a conductive material, such as metal, and is electrically connected between a lead wire of a lamp and a high voltage terminal (not shown) of the inverter PCB. The housing 222 is made of plastic material and surrounds the conductive part. A socket guide 230 fixes the socket 220 to the bottom chassis 200.

The conductive part 221 of the socket includes a lead wire coupling part which couples the socket with the lead wire of the lamp and an inverter terminal coupling part which couples the socket with the terminal of an inverter.

In the conventional LCD module, since the inverter PCB 240 and the inverter cover 250 are attached to the outer surface of the bottom chassis 200, the whole thickness of the LCD module is increased. Further, because the socket 220 needs the housing 222 and a socket guide 230, the manufacturing cost of the socket 220 is increased.

SUMMARY OF THE INVENTION

Embodiments of the present invention provide a thin LCD module having a socket which can be easily and securely assembled in a backlight unit with reduced manufacturing costs and a method for coupling the socket with a PCB.

According to an embodiment of the present invention, there is provided an LCD module including an LCD panel and a backlight unit disposed under the LCD panel. The backlight unit has a bottom chassis, a lamp, a socket, and a balance board. The bottom chassis receives the lamp, the socket, and the balance board therein. The balance board is fixed to the bottom chassis. The socket is coupled with the balance board and the lamp.

According to an embodiment of the present invention, there is provided a method to couple a socket with a balance board. The method comprises arranging a socket, fixing the socket with a jig, provisionally inserting a terminal of a balance board to a terminal coupling part of the socket, and pressing the socket to further insert the terminal into the socket.

BRIEF DESCRIPTION OF THE DRAWINGS

Embodiments of the present invention will become more apparent by describing in detail exemplary embodiments thereof in reference to the attached drawings in which.

DETAILED DESCRIPTION

Hereinafter, embodiments of the present invention will be described in detail with reference to the drawings. The same elements may be indicated with the same reference numbers.

Figure 1:
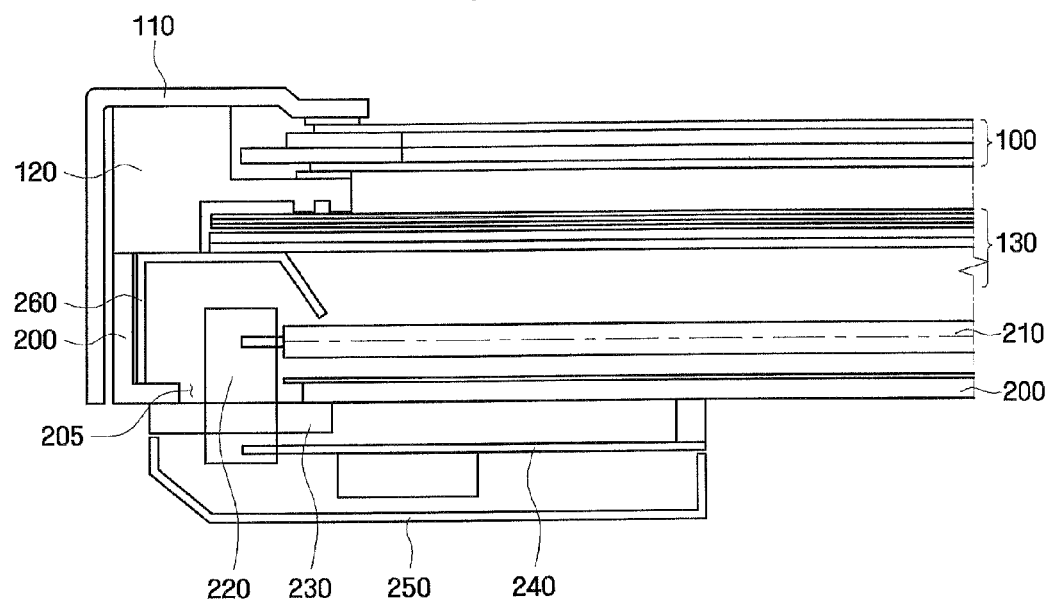
FIG. 1 is a sectional side view of a conventional LCD module.
Figure 2:
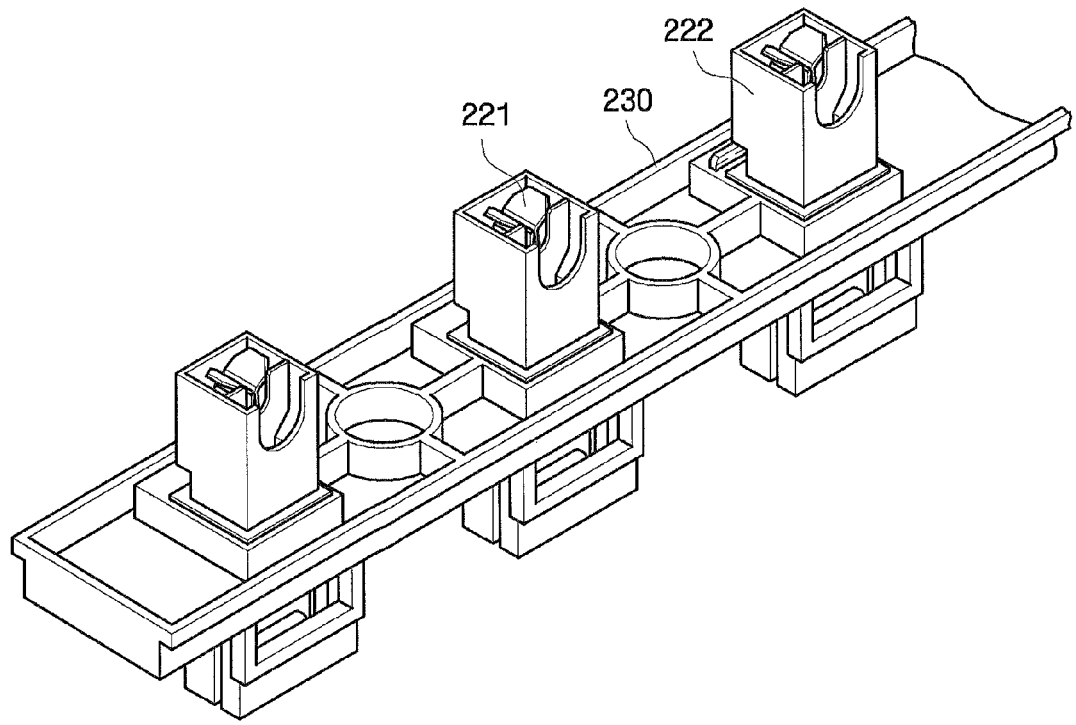
FIG. 2 is a perspective view of a socket and a socket guide used in the LCD module of FIG. 1.

Now, an LCD module according to an embodiment of the present invention is described with reference to FIGS. 3 and 4. An explanation of the elements which have been described above in connection with FIGS. 1 and 2 will not be repeated.

Figure 3:
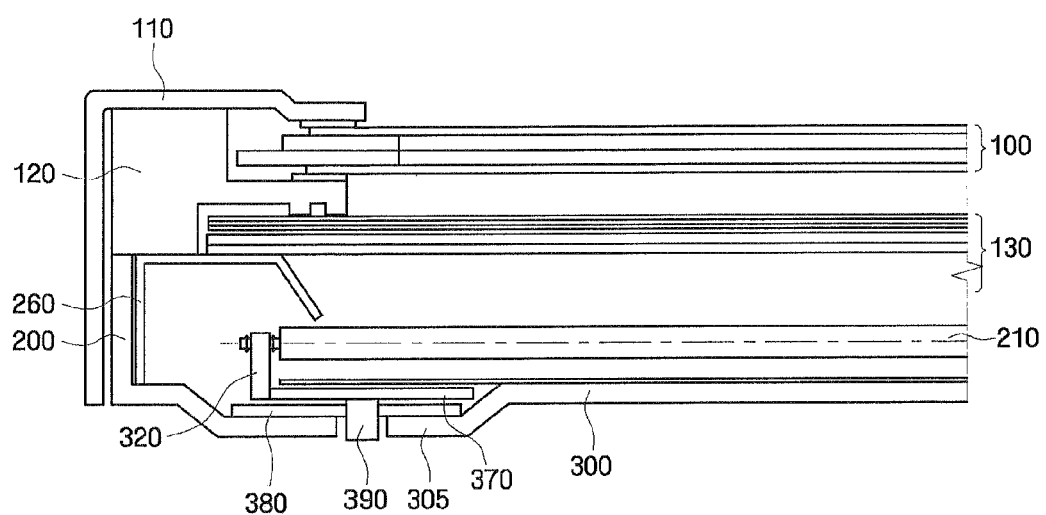
FIG. 3 is a sectional side view of an LCD module according to an embodiment of the present invention.
Figure 4:
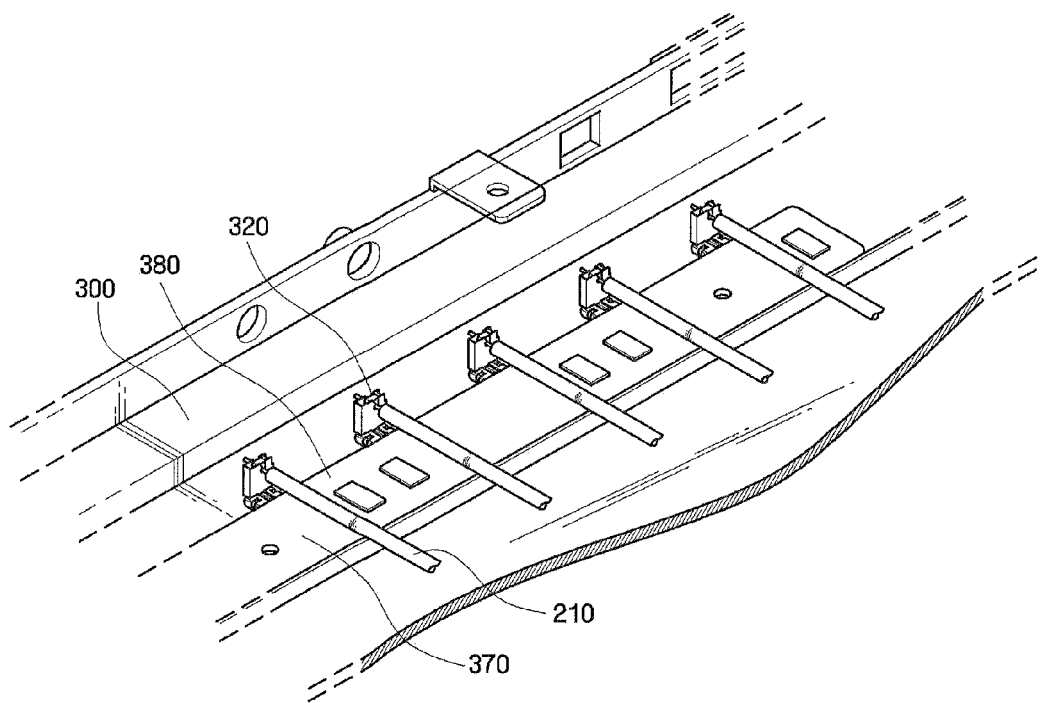
FIG. 4 is a plan view of an LCD module according to an embodiment of the present invention.

FIG. 3 shows a sectional side view of an LCD module according to an embodiment of the present invention, and FIG. 4 is a plan view of a backlight unit of the LCD module of FIG. 3. The backlight unit includes a bottom chassis 300. The bottom chassis 300 includes a receiving portion 305 to receive a balance board 370 which balances voltages inputted to a plurality of lamps. The balance board 370 may balance the_ voltages using capacitors (not shown). The balance board 370 is provided with power from an external power source (not shown), and includes a connector 390 exposed to the outside of a receiving portion 305. An insulation pad 380 is disposed between the balance board 370 and the bottom chassis 300 for stability in electrical driving.

According to an embodiment, when the balance board 370 is located in the bottom chassis 300, an inverter PCB 240, which is thick due to the inclusion of a transformer, may be omitted and thus a thickness of the module may be reduced. An LCD module according to the present embodiment may be, for example, 12 mm thinner than a conventional LCD module employing an inverter PCB. The balance board 370 is mechanically and electrically connected to a lead wire of a lamp 210 via a socket 320. The socket 320 may include a housing made of plastic material. According to an embodiment, the housing may be the same as or similar to housing 222.

Figure 5:
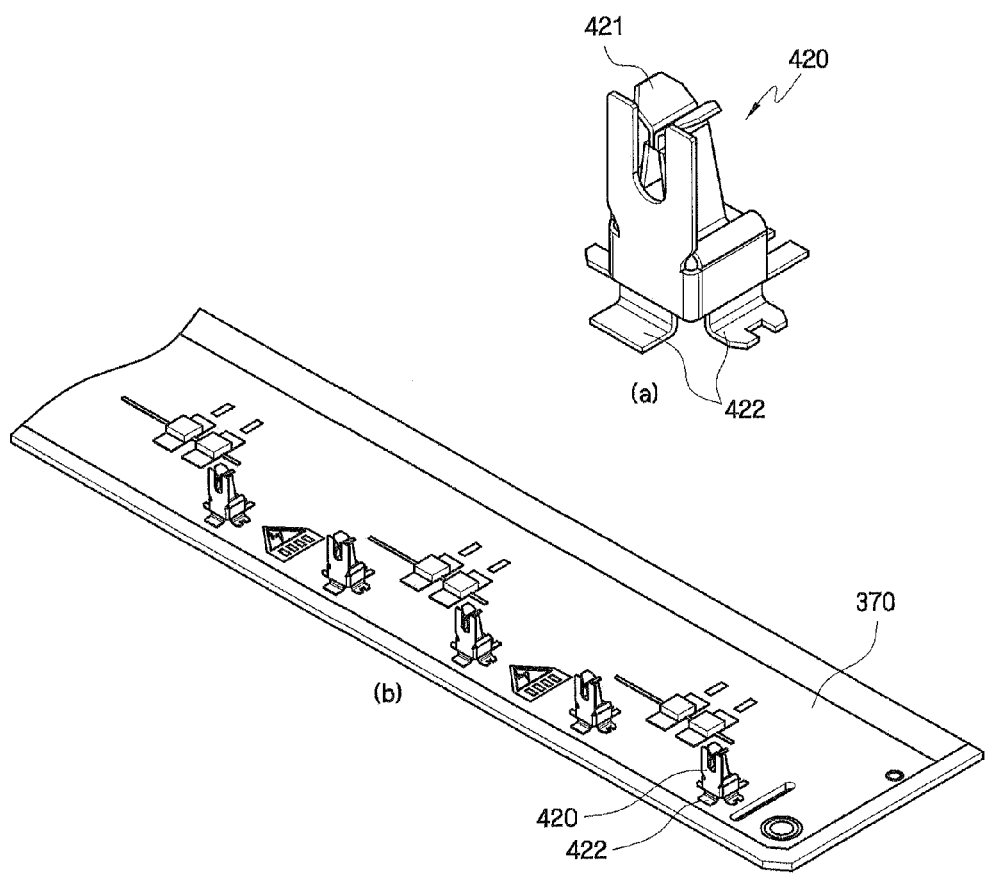
FIG. 5A is a perspective view of a socket according to an embodiment of the present invention.
FIG. 5B is a perspective view of a balance board coupled with the socket.

A socket 420 according to an embodiment of the present invention will be described referring to FIGS. 5A and 5B. The socket 420 is integrally made of conductive material, such as metal. The socket 420 includes a lamp coupling part 421 which mechanically fixes a lead wire of a lamp and enables an electrical connection between the socket and the lead wire. The lamp coupling part 421 may be in the form of 'Y' shape such that the lead wire can be coupled to the coupling part 421 by being moved downward from above the coupling part and being fitted into the coupling part. At its lower part, which contacts the balance board 370, the socket 420 includes a soldering part 422 which is soldered to an exposed conductive terminal (not shown) of the balance board 370. The socket 420 is mechanically supported on the balance board 370 by soldering without an independent housing or a socket guide. The soldering part 422 electrically connects the balance board 370 to the socket 420.

Figure 6A:
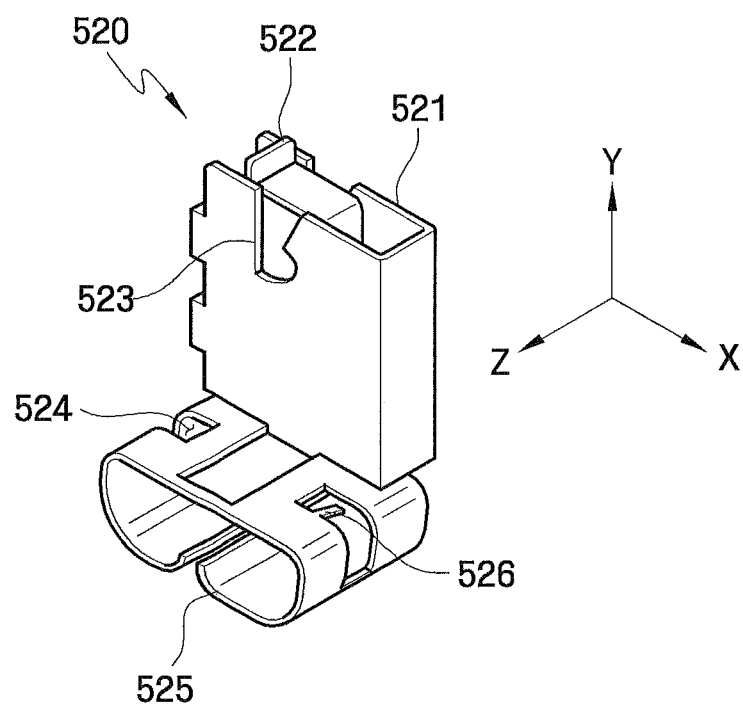
FIG. 6A is a perspective view of a socket according to an embodiment of the present invention.
Figure 6B:
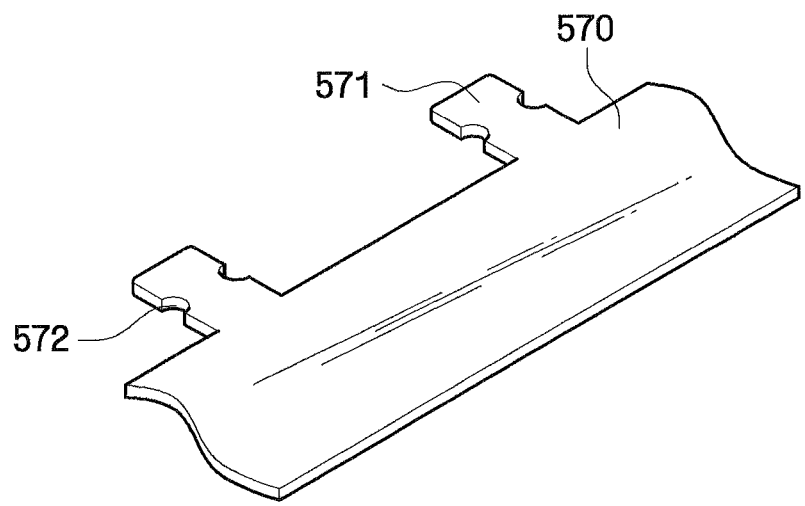
FIG. 6B is a perspective view of a balance board which can be coupled with a socket according to an embodiment of the present invention.
Figure 6C:
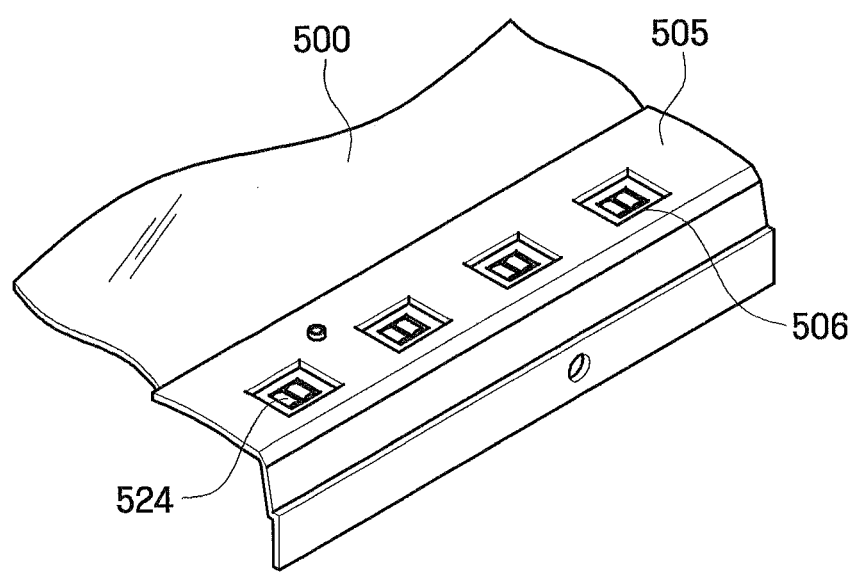
FIG. 6C is a perspective view from the bottom of an LCD module according to an embodiment of the present invention.

A socket 520 according to an embodiment of the present invention will now be described with reference to FIGS. 6A, 6B, and 6C. While describing the socket 520, a positive Y direction as shown in FIG. 6A is referred to as 'upward', and a negative Y direction is referred to as 'downward'. A positive X direction is referred to as 'right direction,' and a negative X direction is referred to as 'left direction'. A positive Z direction is referred to as 'forward', and a negative Z direction is referred to as 'backward.'

The socket 520 includes a lamp coupling part 521 and a board coupling part 524, which may be integrally formed of the same conductive material. The lamp coupling part 521 includes a fixing strip 522 and a fixing groove 523. To facilitate coupling of a lead wire (not shown) of a lamp to the fixing groove 523 moving downward, an upper portion of the fixing groove 523 may be wider than a lower portion of the fixing groove 523. According to an embodiment, the width of the fixing groove 523 may change continuously. Further, the fixing groove 523 may have a receptor (not shown) to receive the coupled lead wire, wherein the receptor protrudes in a left or right direction beyond the fixing groove 523 at a lower part of the fixing groove 523.

The fixing strip 522 fixes a lead wire in the fixing groove 523. The fixing strip 522 may be made of elastic material. According to an embodiment, the fixing strip 522 is fixed below a lower part of the fixing groove 523 and protrudes upward. An upper portion of the fixing strip 522 swings in left and right directions due to its elasticity. The fixing strip 522 may be formed substantially corresponding to a left or right side of the fixing groove 523. The phrase "formed substantially corresponding to a side of a fixing groove" for a fixing strip means that the fixing strip has substantially the same position in the X direction as the position of a side of the fixing groove, and the fixing strip is parallel to the side. In the case where the fixing strip 522 is formed substantially corresponding to a left side of the fixing groove 523, when a lead wire is coupled with the fixing groove 523, an upper portion of the fixing strip 522 is bent to the right, and then the lead wire is inserted in a gap between the bent fixing strip 522 and the left side of the fixing groove 523. After the lead wire is inserted, the bent fixing strip 522 is released to fix the lead wire with the left side of the fixing groove 523 due to the elasticity of the fixing strip 522. In the case where a fixing strip 522 is formed substantially corresponding to a right side of the fixing groove 523, the left and right in the above description are exchanged with each other. When a receptor is formed at a lower part of the fixing groove, the fixing strip 522 may be formed substantially corresponding to the side of the fixing groove.

According to an embodiment, the lamp coupling part 521 may be in the shape of Y similar to the lamp coupling part 421 of the socket 420.

The board coupling part 524 projects forward from the lamp coupling part 521. According to an embodiment, a coupling between a balance board 570 and the board coupling part 524 is made as a terminal 571 of the balance board is inserted backward into the board coupling part. The board coupling part 524 has a clip 525 to maintain the coupling between the board coupling part and the terminal 571 of the balance board 570. The clip 525 may be in the shape of an arch.

The board coupling part 524 includes a fixing pin 526 to further secure the coupling between the board coupling part and the terminal 571. The fixing pin 526 may be formed at an upper portion of the board coupling part 524. According to an embodiment, the fixing pin 526 obliquely protrudes downward from an upper surface of the board coupling part 524 and backward from the front of the board coupling part 524.

The socket 520 is coupled with the balance board 570. According to an embodiment, the terminal 571 includes a concave portion 572. In the case where the socket has the fixing pin 526, and the terminal 571 of the balance board 570 includes the concave portion 572, the fixing pin 526 is inserted into the concave portion 572 when the socket and the balance board are coupled to each other. The fixing pin 526 prevents separation between the socket and the board, and thus, the coupling becomes stronger.

The bottom chassis 500 includes a receiving portion 505 to receive the balance board 570 therein. The receiving portion 505 includes a hole 506 at a position corresponding to the terminal 571 of the balance board. The hole 506 provides electrical insulation between the bottom chassis 500 and the board coupling part 524 of the socket 520. When the hole 506 is formed on the receiving portion 505, a hollow portion of the hole 506 may be filled with an insulator (not shown), such as an insulating tape, to prevent a foreign body to enter the receiving portion through the hollow portion.

A conducting part (not shown) may be formed on a lower surface of the terminal 571. According to an embodiment, an electrical connection between the balance board 570 and the socket 520 is made by the conducting part and the clip 525 of the socket 520.

Figure 7:
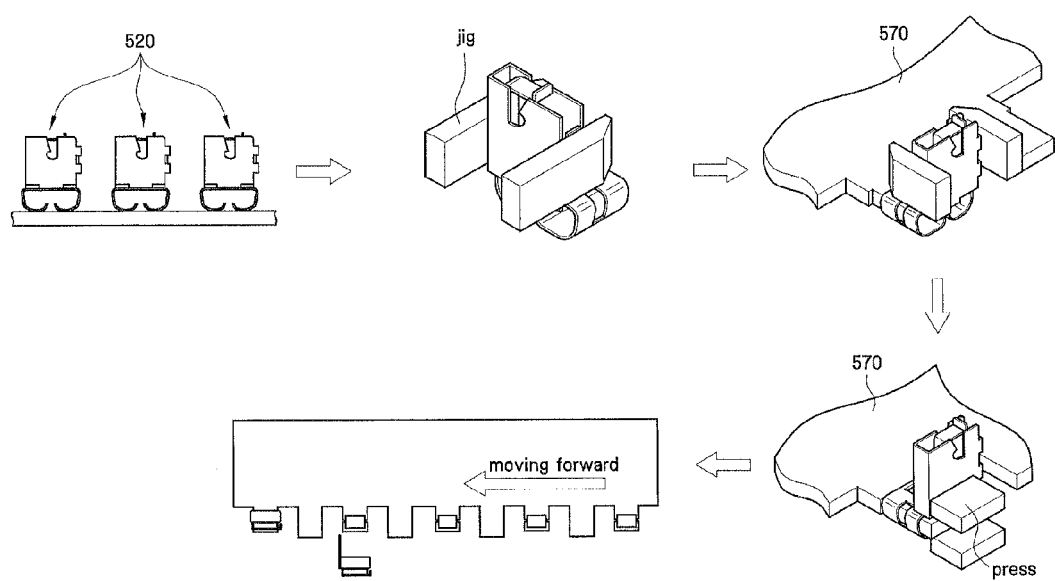
FIG. 7 is a flow diagram showing a coupling method according to an embodiment of the present invention.

Hereinafter, a method to couple the socket 520 with the balance board 570 will be described with reference to FIG. 7. To couple the socket 520 with the balance board 570, the socket 520 is arranged at a predetermined position and then grasped with a jig. The balance board 570 is moved in front of the socket 520, and a terminal of the balance board 570 is provisionally inserted into the board coupling part 524 of the socket 520. The socket 520 may move for the provisional insertion. Then, a press presses the socket 520 on the opposite side from the balance board 570 so as to thoroughly further insert the terminal into the socket 520.

The socket 520 may be grasped with the jig and moved for the provisional insertion after the balance board 570 arrives at the position for the insertion.

In cases where a plurality of sockets are inserted, after the plurality of sockets 520 are disposed at a predetermined distance from each other, the balance board 570 moves forward and is thereby coupled with each of the plurality of sockets.

While the present invention has been described using some exemplary embodiments, it should be understood that the presentation of the embodiments is not to restrict the scope of the present invention into the embodiments, and that various changes, substitutions and alternations can be made without departing from the spirit and scope of the invention as defined by the appended claims.

What is claimed is:

1. An LCD module comprising an LCD panel and a backlight unit disposed under the LCD panel, wherein the backlight unit comprises:
    a bottom chassis,
    a balance board fixed on the bottom chassis, wherein the balance board is positioned inside the bottom chassis,
    a socket coupled with the balance board, and
    a lamp coupled with the socket, wherein the lamp, the socket, and the balance board are received in the bottom chassis.

2. The LCD module of claim 1, wherein the bottom chassis comprises a receiving portion to receive the balance board.

3. The LCD module of claim 1, wherein the backlight unit further comprises an insulating pad between the bottom chassis and the balance board.

4. The LCD module of claim 1, wherein the balance board comprises at least one capacitor.

5. The LCD module of claim 1, wherein the socket comprises a lamp coupling part and a board coupling part which are integrally formed of a same conductive material.

6. The LCD module of claim 5, wherein the lamp coupling part comprises a fixing strip and a fixing groove.

7. The LCD module of claim 6, wherein the fixing strip has elasticity, is fixed under the fixing groove in the lamp coupling part, and is formed substantially corresponding to a side of the fixing groove.

8. The LCD module of claim 6, wherein an upper portion of the fixing groove is wider than a lower portion of the fixing groove.

9. The LCD module of claim 6, wherein the fixing groove comprises at its lower portion a receptor protruding from a left side or a right side of the fixing groove.

10. The LCD module of claim 9, wherein the fixing strip has elasticity, is fixed under the fixing groove in the lamp coupling part, and is formed substantially corresponding to a side of the fixing groove from which the receptor protrudes.

11. The LCD module of claim 5, wherein the board coupling part comprises a clip.

12. The LCD module of claim 11, wherein the clip is in the shape of an arch.

13. The LCD module of claim 11, wherein the board coupling part further comprises a fixing pin, the fixing pin obliquely protruding downward from an upper surface of the board coupling part and backward from a front of the board coupling part.

14. The LCD module of claim 13, wherein the balance board comprises a terminal, the terminal comprising a concave portion receiving the fixing pin to prevent separation between the socket and the balance board.

15. The LCD module of claim 14, wherein the terminal comprises a conductive part on its lower surface.

16. The LCD module of claim 15, wherein the bottom chassis further comprises a receiving portion to receive the balance board, the receiving portion comprising a hole at a position corresponding to the terminal wherein the hole is filled with an insulator.

17. A method to couple a socket with a balance board comprising:
    grasping the socket with a jig;
    provisionally inserting a terminal of the balance board into a board coupling part of the socket; and
    pressing with a press the socket to further insert the terminal into the socket.

18. The LCD module of claim 1, wherein the balance board includes a connector exposed through the bottom chassis.

* * * * *